M. ANDREW.

Taps for Oil-Vessels.

No. 6,141. Reissued Nov. 17, 1874.

WITNESSES;

Geo. R. Sifferd

John McBrone

INVENTOR;

Matt Andrew

UNITED STATES PATENT OFFICE.

MATTHEW ANDREW, OF MELBOURNE, AUSTRALIA.

IMPROVEMENT IN TAPS FOR OIL-VESSELS.

Specification forming part of Letters Patent No. 94,059, dated August 24, 1869; reissue No. 4,014, dated June 7, 1870; reissue No. 5,020, dated August 6, 1872; reissue No. 6,141, dated November 17, 1874; application filed September 25, 1874.

*To all whom it may concern:*

Be it known that I, MATTHEW ANDREW, of Melbourne, in the Colony of Victoria, Australia, have invented certain new and useful Improvements in Vessels for Containing Oils or other Liquids, and in devices for drawing the contents from the same; and I do hereby declare that the following is a full and exact description thereof, reference being had to the accompanying drawing forming a part of this specification.

These improvements relate mainly to providing vessels containing oil or other liquid with devices which I call capsule-taps, which are constructed and attached to the said vessels in the following manner:

The drawings illustrate two modifications in the form of my invention.

Figure 1:
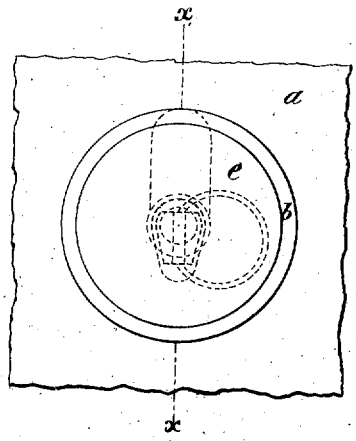
Figure 2:
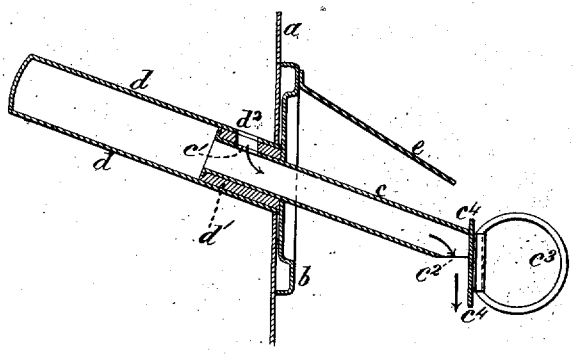
Figure 3:
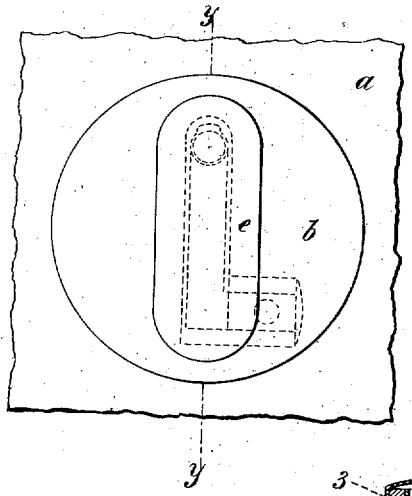
Figure 4:
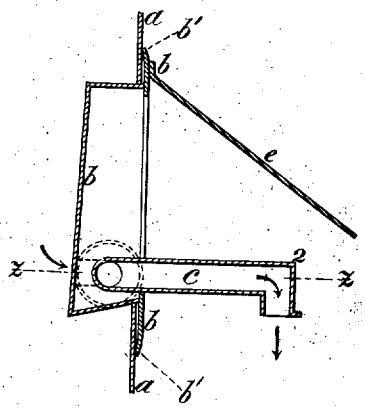
Figure 5:
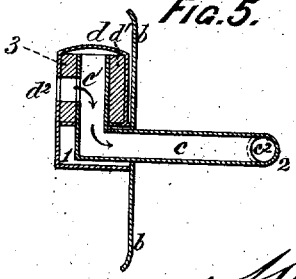

Figure 1 is a front view of part of a vessel provided with one of my improved taps. Fig. 2 is a section on the line *x x*, Fig. 1. Fig. 3 is a front view of a modification of my invention. Fig. 4 is a section on the line *y y*, Fig. 3. Fig. 5 is a section on the line *z z*, Fig. 4.

Like letters indicate the same parts throughout the drawing.

A hole is cut in any suitable part of the vessel *a* in the ordinary manner, through which hole the said vessel is filled with the oil or other liquid. A cap or cover, *b*, is soldered over this hole, and a central hole is pierced in the said cap. In this hole is inserted a tube or pipe, *c*, slightly smaller in external diameter than the hole, but of sufficient diameter to serve as a tap. The inner end of this tube or pipe is pressed somewhat open, for the purpose of preventing its being withdrawn more than a certain distance. Near this end of the tube a hole, $c^1$, is made in the side thereof, for the passage of the liquid to be drawn from the vessel *a*. The tube *c* is fitted within a box-tube or socket, *d*, which has a cork, leather, or other lining, $d^1$, extending for a short distance from the open end thereof, and made to fit tightly round the tube *c*. In the inside of this box-tube *d* is a hole, $d^2$, which also extends through the cork or other lining $d^1$ thereof, and which corresponds with the hole $c^1$ in the side of the small tube *c*, so as to permit the free passage of the contained liquid when the said small tube is properly drawn forward, as shown in Fig. 2. The outer end of the said box-tube is sloped or beveled in such a manner that when it is soldered to the cap or cover *b* it forms a slight angle therewith. The tube *c* has a hole, $c^2$, at its outer end, and this hole should be made at the under side of the said tube, as shown, to allow the liquid to pass through it and escape in a downward direction when the tube *c* is drawn out to its full extent. When the tube is pushed in, the holes $c^1$ and $d^2$ are closed, and the ingress of the liquid to the box-tube is stopped. The tube *c* has fastened to its outer end a ring, $c^3$, which forms a convenient means for drawing out the said tube. The cap or cover *b*, thus provided with the box-tube *d*, containing the smaller tube *c*, forms at once a capsule and a tap; and as a means of protection to the said tap, to prevent its being opened before the vessel *a* reaches its final destination, the smaller tube *c* is pressed in, with the small flange $c^4$ resting upon the cover *b*, the ring $c^3$, which is formed with a hinge or joint for the purpose, is turned down and laid flat upon the said cover, and a thin piece of brass or other metal, *e*, is soldered over the face of the cap or cover *b*.

When the vessel *a* has been filled with the oil or other liquid, and it is desired to close the same, the cover *b* of the capsule-tap has simply to be soldered upon the hole cut in the said vessel, and, when required, the tap is made available by removing the piece *e* of brass or other metal soldered on the face of the said capsule-tap.

In the modification of my invention illustrated in Figs. 3, 4, and 5 the small tube, *c*, which is made of brass, copper, tin, glass, porcelain, or any other suitable material, is L-shaped, the upright portion from 1 to 2 being preferably about one and one-half inch long, and the horizontal part from 1 to 3 about three-quarters of an inch, and its diameter being suitable for drawing off the oil or other liquid from the vessel. The hole $c^1$ is made in the side of the horizontal part of this tube, at an angle to the upright portion of the tube of about eighty degrees, to admit the liquid to flow through the said tube. The cork or other suitable lining $d^1$ is fitted closely around the horizontal part of the tube, and within the external tube or socket *d*, which is made of tin or any other convenient material, so as exactly to cover the cork or other lining. In the center of this external tube or socket, and also in the cork or other lining, is made the hole $d^2$, which corresponds in size and position with the hole $c^1$ in the side of the horizontal part of the tube *c*. The cap or cover *b* is depressed or indented in such a way that the tube *c*, when formed as above described, will conveniently lie therein, a sufficient margin, *b'*, around being left not depressed, by which it can be soldered over the hole cut in the tin or other vessel *a* for filling the same. In this cap or cover a hole is made exactly corresponding in position with the hole already described in the external tube *d*. The horizontal tube being laid in the depressed or indented part of the cap or cover *b*, the external tube *d* is soldered to the said cap or cover, or otherwise firmly fixed thereto, but in such a way that the holes should coincide. The tube *c* has a hole, $c^2$, made at its outer end in such a position as to give the liquid at its exit a downward direction, as shown in Fig. 4. When the tap is turned back within the recess it will have no part projecting above the surface of the cover *b*, and I then solder or otherwise secure over the said recess or indented portion of the cap the thin piece *e* of brass or other metal, as hereinbefore described. The capsule-tap can then be attached to the can or other vessel *a* by being soldered over the hole made for filling the same, and when it is desired to draw the contents from the said vessel, the thin piece of metal can be readily removed and the tube *c* turned into the position shown in Fig. 4, the holes in the tubes being thereby made to communicate with each other and permit the liquid to escape.

I do not confine myself to the precise form or construction of these capsule-taps herein described and illustrated, as they may be varied within certain limits; but they must always be adapted to the main object of my invention, which is to secure oil or other liquid in a vessel by a capsule that will also serve the purpose of a tap to draw off the contained liquid without causing any external projection upon such vessel as would interfere with the convenient packing of the same for transportation.

What I claim as my invention, and desire to secure by Letters Patent, is—

1. A capsule-tap consisting of the cap or cover *b*, the adjustable tube *c*, and outer tube or socket *d*, the said tubes being provided with cork with apertures arranged to be opened and closed by the adjustment of the tube *c*, which is formed and arranged to leave no part projecting beyond the cover *b*, and is secured by a thin plate or sheet of metal, *e*, all substantially as and for the purposes set forth.

2. As a new article of manufacture, a capsule-tap for metallic cans, consisting of a cap or capsule combined with a tap or faucet, substantially as described.

MATTH. ANDREW.

Witnesses:
JOHN McCRONE,
JNO. R. LEFFERTS.